March 28, 1944. I. JEPSON ET AL 2,345,262
FILTER ASSEMBLY FOR COFFEE MAKERS
Filed Dec. 6, 1940  2 Sheets-Sheet 2
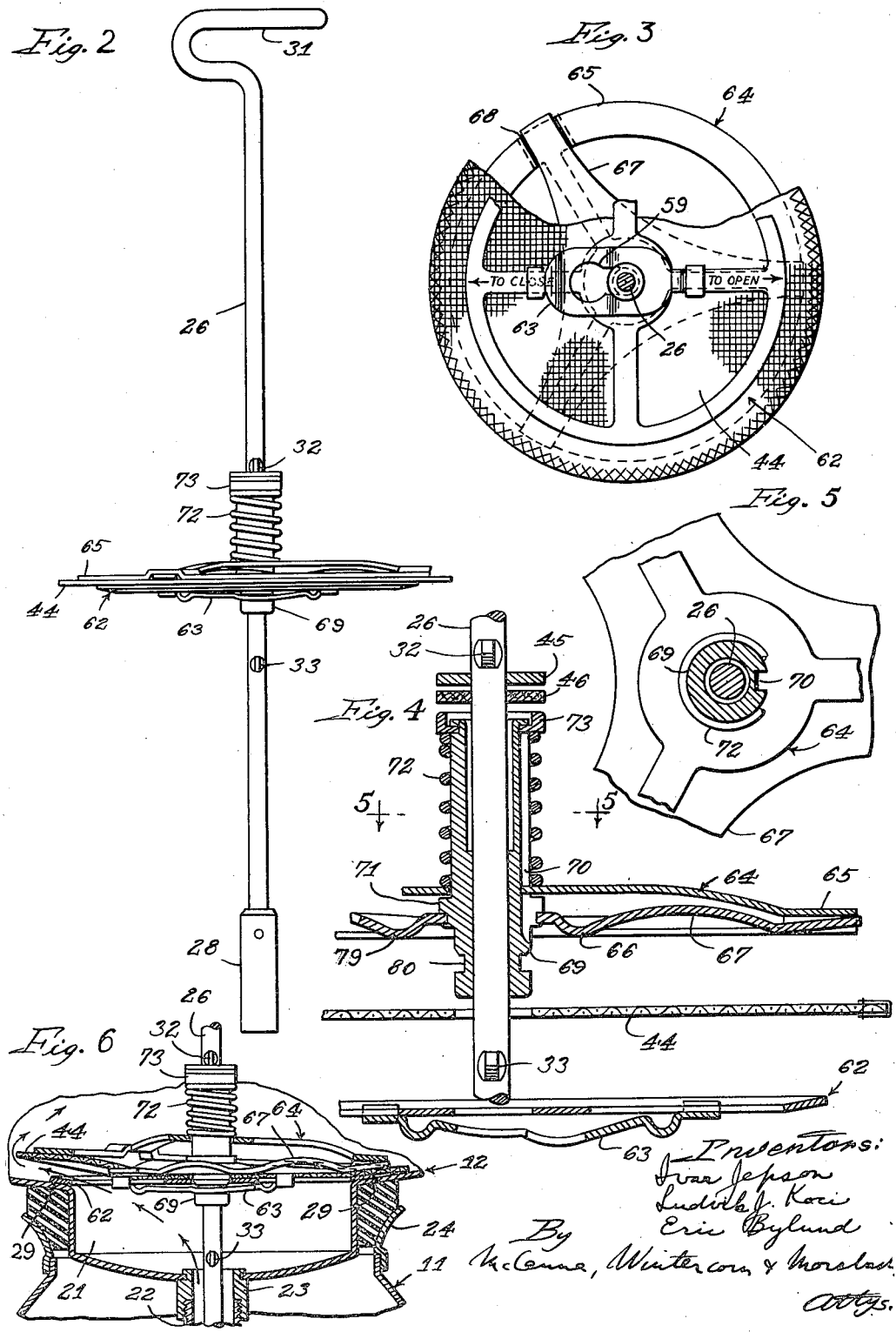

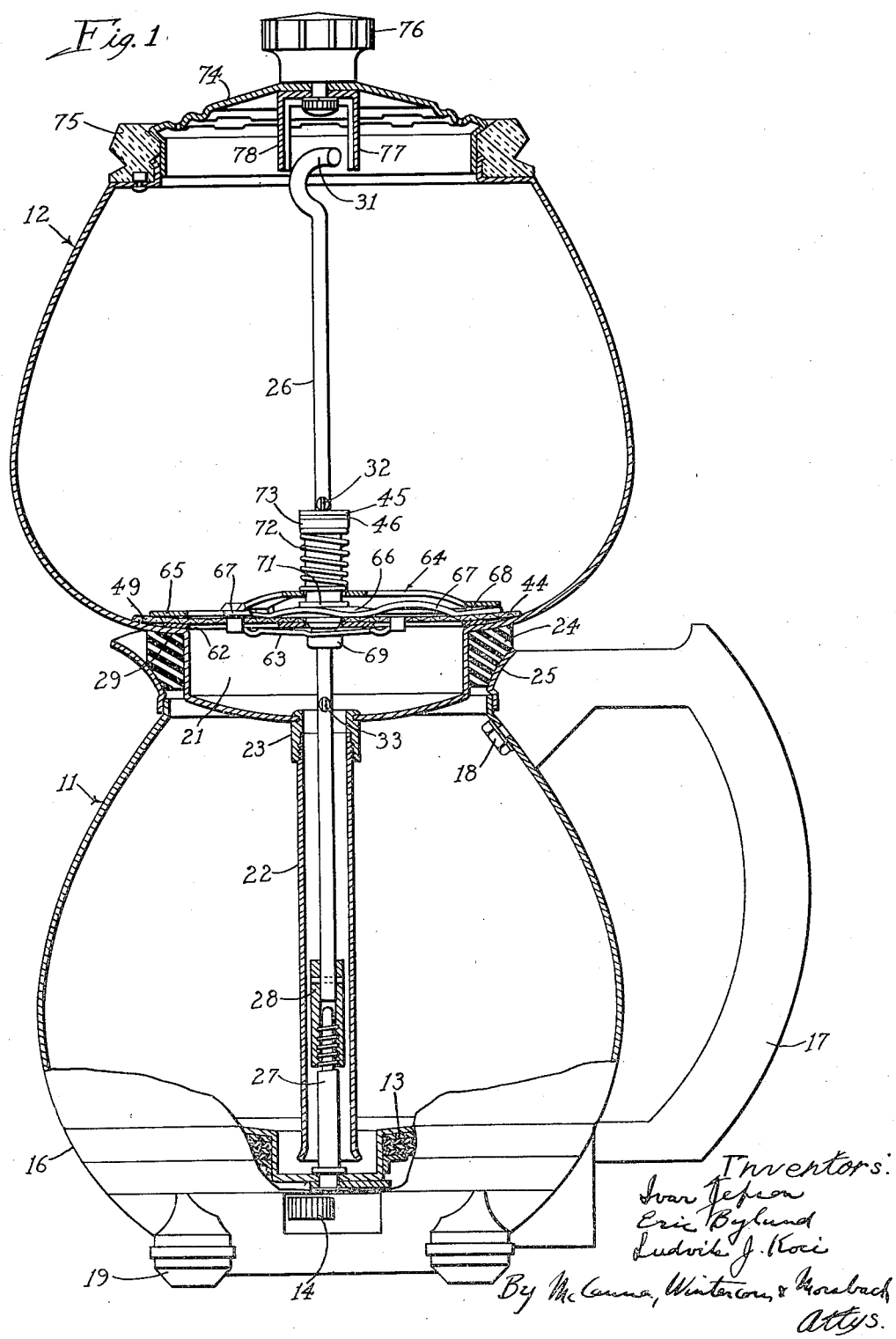

Patented Mar. 28, 1944

2,345,262

UNITED STATES PATENT OFFICE 2,345,262

FILTER ASSEMBLY FOR COFFEE MAKERS

Ivar Jepson, Ludvik J. Koci, and Eric Bylund, Chicago, Ill., assignors to Chicago Flexible Shaft Company, Chicago, Ill., a corporation of Illinois Application December 6, 1940, Serial No. 368,758

17 Claims. (Cl. 99—292)

This invention relates to improvements in the kind of coffee maker commonly known as the vacuum type in which the water is heated in one container and transferred to another for contact with the ground coffee whereupon it is returned to the first container. This application has especial reference to the filter assembly for such coffee makers.

One object of our invention is to provide an improved and simplified filter means that will insure the provision of clear coffee.

Another object of our invention is to provide a filter assembly having a filter cloth that may be conveniently and easily removed and replaced for cleaning purposes.

Still another object of our invention is to provide a filter assembly of a fool-proof construction to prevent breakage or other damage to the coffee maker or injury or inconvenience to the operator under abnormal operating conditions. Such a condition might occur, for example, if the coffee-grounds were mistakenly placed in the pot portion of the maker along with the water, rather than in the bowl disposed above the pot. Since in a preferred embodiment the bowl has communication with the pot through a depending tube at the top of which is the filter assembly, the coffee-grounds would be forced into this tube in response to the pressure developed by the heat applied to the pot. In other constructions the grounds would be disposed to pack within the tube against the filter, thereby blocking the tube and causing extreme pressure in the pot which is apt to break it or force the bowl to unseat itself therefrom. In any case, the grounds become packed so tightly in the tube that they become difficult to remove. In our invention, the filter assembly is provided with a safety-release device that permits the raising of the filter cloth to provide a passageway therearound upon the existence of a predetermined pressure within the pot. It has been found that this will prevent the blocking of the depending tube of the bowl because the grounds suspended in the water will flow upwardly through the passageway and into the bowl 12.

The invention is illustrated in the accompanying drawings, in which—

Figure 1 is a vertical section through a coffee maker embodying our invention, showing the filter assembly in elevation;

Fig. 2 is a side elevation on a larger scale of the filter assembly removed from the coffee maker;

Fig. 3 is a bottom elevation of the filter assembly, partly in section;

Fig. 4 is a longitudinal section through the filter assembly on a further enlarged scale and partly fragmentary, showing a removable filter cloth and lower frame in spaced relation with respect to the upper frame;

Fig. 5 is a transverse section on the section line 5—5 of Fig. 4; and

Fig. 6 is a fragmentary longitudinal section of the filter assembly disposed in the bottom of the coffee maker bowl showing the passageway provided by the safety feature of the invention.

Referring to Fig. 1, the coffee maker shown is one known as the vacuum type which operates by the displacement of water from the coffee pot into another container containing the coffee grind. After mixing with the grind, the coffee is caused to return to the pot through the lowering of the temperature therein. Aside from the filter assembly, the coffee maker shown in Fig. 1 is substantially the same as that disclosed in Jepson Patent Nos. 2,312,555 and 2,312,556, granted March 2, 1943. Briefly, this type of coffee maker consists of a pot 11 and a coffee container or bowl 12 disposed above the pot 11. As more fully explained in the above-mentioned applications, heat is supplied to the pot 11 by an electrical heating unit comprising a heating element 13 and a thermostatic mechanism which controls the heat during a coffee making stage and a coffee warming stage. A switch 14 is provided to initiate the coffee making stage of operation, that is, to initiate the automatic cycle of operations disclosed in said Patent No. 2,312,444. The present invention, however, is not limited to the inventions of said applications.

In the embodiment here shown for purpose of illustration the pot 11 is supported in a base 16 of an insulating material such as a molded plastic. The lower end of a handle 17 is attached to the base 16 while the other end is secured to the upper portion of the pot 11 by a screw 18. Legs 19 are provided on the base 16 to elevate the pot from a table surface to prevent the scorching or burning thereof. The bowl 12 is of a generally symmetrical shape and has a bottom well 21 which terminates in a displacement tube 22 that is connected to the bowl by a threaded boss 23 which permits the removal of the tube for cleaning. A gasket 24 is mounted on the well portion 21 of the bowl 12 to seat against an outwardly flared rim 25 of the pot 11 to provide a means for securing the bowl to the pot to form a steam tight joint therebetween.

In the preferred embodiment of our invention, the bowl 12 is securely clamped to the pot 11 by a rod 26 which extends downwardly into the tube 22 to fasten onto an upstanding stud 27 that is secured to the bottom of the pot 11. An internally threaded sleeve 28 secured to the lower end of the rod 26 is provided to engage the threads on the stud 27. As will be more fully described, the marginal portion of a filter assembly is pressed against an annular surface 29 of the bowl 12 as the rod 26 is screwed into the stud 27. A hooked upper end portion 31 of the rod 26 provides convenient means for turning it so that it may be fastened or removed from the stud 27. Spaced abutments 32 and 33 are provided at the central portion of the rod 26, the upper abutment 32 being located to exert downward pressure upon the filter assembly as the rod 26 is tightened to the stud 27.

The present invention provides a filter assembly of improved construction characterized by the safety feature above mentioned. This feature is preferably, but not necessarily, embodied in a filter assembly in accordance with the invention disclosed in the application of Ivar Jepson and Eric Bylund, Serial No. 457,242, a division of the present application. The present invention is, in another phase, characterized by the provision of a filter assembly in which the filter cloth is marginally clamped in its sealing position and in which a plural part frame structure is provided to hold the filter cloth. In this assembly an upper part is adapted to be upwardly displaced to allow corresponding displacement of the filter cloth in response to excessive pressure from within the lower pot, and another part of which frame remains in the clamping position so as to maintain the upper bowl firmly clamped against the lower pot in the event of any such abnormal pressure condition. In the embodiment herein disclosed the filter assembly includes a filter element of the disc type preferably in the form of a filter cloth 44; and the frame structure includes upper and lower frame members adapted to clamp the interposed filter cloth to properly support it on the rod 26 when the latter is being inserted and removed from the coffee maker and when it is supported in the operative filter position. The frame members may be of one-piece stamped metal construction which provides sufficient flexibility to avoid their setting in a distorted shape through continued use. Thus, when the marginal edge portion of the filter assembly is pressed against the annular surface 29 of the bowl 12, it will adapt itself to the annular bowl surface 29 to provide a tightly fitting seal therearound. The filter cloth is imperforate except for a center hole to receive the rod 26, and the cloth is adapted to be firmly clamped closely around this center hole to prevent the passage of material therethrough, as will be presently described. The frame members are carried on a sleeve designated generally by 69 freely slidable axially and rotatably on the rod 26 between the abutments 32—33. The lower frame member is detachably connected to the sleeve 69 by any suitable means as, for example, a slidable clip 63 having a key-hole slot 59 the narrow end of which is adapted to engage in a groove 80 in the sleeve 69 to hold the parts in the connected position, as shown in Fig. 3. By sliding this clip to the right the larger end of the opening 59 will be brought into registration with the sleeve, thus permitting removal of the lower frame by passage of the lower end of the sleeve through said larger opening. This permits removal of the filter cloth from the lower end of the filter assembly. It will be understood, of course, that this unfastening and removal of the filter cloth takes place after the filter assembly has been removed from the coffee maker. Washers 45 and 46 on the rod 26 between the sleeve 69 and the upper abutment 32 (as best shown in Fig. 4), provide thrust bearing surfaces for the turning of the abutment 32 to impart downward thrust against the filter assembly when the rod 26 is screwed on to the stud 27 when connecting the parts in operative relation.

In operation, the coffee grind will be placed in the bowl 12 and the water in the bowl 11. As the water is heated it will be forced in the tube 22 through the filter cloth 44 and into the bowl 12 until it is substantially all displaced from the pot 11 into the bowl 12. Upon release of the pressure in the pot 11 by the lowering of its temperature, the coffee mixture in the bowl 12 will run downwardly through the filter assembly through the tube 22 to the pot 11, its grounds being filtered out by filter cloth 44. It should be clear that the filter cloth including its extreme marginal edge 49 establishes a seal across the well 21 to prevent any coffee grounds from returning with the coffee.

When all the liquid has returned to the pot 11, the bowl 12 is removed from the pot 11 by unscrewing the rod 26 from the stud 27 and lifting the bowl 12 containing the filter assembly from the pot 11. It will be observed that this unscrewing of the rod 26 takes place without disturbing the sealing position of the filter cloth, due to the fact that the rod turns freely in the sleeve 69 while being disconnected from the stud 27. The rod 26 and the filter assembly supporting the coffee grounds may then be removed from the bowl 12 by lifting the rod 26 through grasping its hooked portion 31. During this procedure, the abutment 33 will engage the bottom portion of the bolt member 39 to support the filter assembly on the rod. To remove the filter cloth 44 for cleaning, the lower frame member 62 is removed by unfastening the clip 63 permitting both the lower frame 62 and the filter cloth 44 to be disassembled from the rod 26. Assembly of the filter cloth to the rod 26 is accomplished in the reverse manner, whereupon the rod and filter assembly may be installed in the bowl 12 and pot 11 as previously described.

Referring more particularly to the frame construction herein disclosed, the upper frame consists of two members, one being a frame 64 having a circular marginal portion 65 and the other an intermediate frame member 66 having three radial arms 67 whose extreme end portions seat within corresponding recesses 68 in the marginal portion 65. The frame member 66 is fixed to a sleeve 69 slidably mounted on the rod 26. The frame 64 is also mounted at its center on the sleeve 69 above a shoulder 71, being pressed thereagainst by a coiled spring 72 whose upper end abuts a collar 73. The frame 64 is prevented from turning on the sleeve 69 by engagement with a keyway 70 so that the recesses 68 will at all times be in registration with the end portions of the radial arms 67.

Viewing Fig. 4 it will be observed that the center opening in the filter cloth is of sufficient size to receive the lower end of the sleeve 69 so that the filter cloth is adapted to be seated against the annular surface 79 on the underside of the frame member 66 near the hub portion thereof and to be clamped thereagainst by the lower frame member as shown in Fig. 6, thus providing an effective seal around the center opening in the filter cloth to prevent leakage of coffee grounds therethrough when the filter assembly is in operative position in the coffee maker. In this position the filter cloth is clamped by means of the radial arms 67 and the marginal portion 65 of the upper frame members.

If the filter cloth 44 is clogged from beneath such as by the operator mistakenly placing the coffee grind in the pot 11 rather than in the bowl 12, the pressure exerted on the filter cloth will be sufficient to raise the frame 64 against the compression of the spring 72 to permit the water and coffee-grounds to pass into the bowl 12 through the passageway indicated in Fig. 6. This will prevent the breaking of the steam tight seal about the gasket 24 and will prevent the wedging and packing of the coffee-grounds within the tube 22. It will be observed that this upward movement of the upper frame 64 is caused by the filter cloth being displaced upwardly in one or more of the areas between the radial arms 67 as a result of excessive pressure from within the pot 11. This might occur as a result of carelessness or mistake in placing the ground coffee in the lower pot instead of on top of the filter assembly after the bowl 12 has been properly clamped in position by means of the filter assembly. In such event, coffee grounds are apt to be forced up through the tube and packed against the underside of the filter cloth, thus setting up sufficient resistance to passage of the heated water and vapor upwardly through the filter that the increasing pressure resulting from the normal increase in heat during the coffee making operation will cause the filter cloth and the upper frame 64 to be displaced upwardly against the tension of the spring 72. This permits the collected material to pass around the filter and into the bowl 12 without danger to the structure or to any person near by. It will also be observed that the position of the intermediate frame member 66 is not disturbed as a consequence of the described displacement of the upper frame member 64. Instead, this intermediate frame member remains in the clamped condition, that is, with its radial arms clamped down against the filter cloth at the local areas of engagement of the flat marginal face portions of said radial arms with the filter cloth and that this downward pressure is also applied through the filter cloth against the frame 62 and through this member against the bottom 29 of the bowl to maintain the clamping relation between the bowl and the pot. Thus, even though the upper frame 64 is upwardly displaced for the safety relief purpose described, the clamping effect of the filter assembly against the bowl is maintained, thus keeping the seal between the bowl and the pot. However, in the remote contingency of the passage in the tube 22 being stopped, the clamping arms 67 are of such resiliency as to permit upward displacement of the bowl from its seat to provide relief for the excessive pressure. It will also be observed that the marginal portion 65 of the upper frame member is recessed at 68 so that the filter engaging face of each radial arm will be flush with the filter engaging face of the marginal portion 65, thereby providing substantially continuous marginal clamping of the filter cloth against the bottom surface 29 of the bowl. Through the provision of this safety feature which acts as a valve between the pot 11 and bowl 12, it has been found that a liquid passage will always be provided therebetween through the tube 22 upon the existence of a predetermined pressure against the under side of the filter cloth 44.

As is more fully described in the Jepson applications hereinbefore mentioned, a cap 74 that seats within an annular ring 75 of an insulating material provides a closure for the bowl 12 and also for the pot 11 when the bowl 12 is removed therefrom. The cap 74 contains a knurled knob 76 and opposed flanges 77 and 78, the latter of which engage the hooked end portion 31 of the rod 26 so that it may be turned onto or from the stud 27 through the turning of the cap 74.

Our invention contemplates broadly the provision of means for maintaining the upper vessel of a coffee maker seated on a lower heating vessel with a steam tight seal between the vessels, which seal is to be broken only when removing the upper vessel, the provision of means for filtering the flow of liquid between the vessels in the coffee making operation, and the provision of means to allow passage of material such as heated water, steam, and coffee grounds from the lower vessel into the upper vessel in response to excessive or abnormal pressure from within the lower vessel as a consequence of incorrect use of the coffee maker, and this without opening the steam tight joint between the vessels. This safety feature does not interfere with the normal use of the coffee maker. It will be particularly noted that our invention provides relief passage of material from within the lower vessel without permitting escape of steam and hot water laterally or upwardly through the seal between the upper and lower vessels, thereby avoiding the danger of burning or injuring any person near the coffee maker. In the preferred embodiment of the invention herein disclosed this relief passage is provided through displacement of the filter cloth or a portion thereof, with the material passing upwardly into the upper vessel; and it should be understood that our invention is not to be limited to the particular embodiment herein disclosed but rather that it contemplates any equivalent means for performing these functions.

The term "filter cloth" as used in the claims is intended to mean any filter element or medium adapted to coact with the parts recited to perform the functions of this invention.

Various modifications may be made in the device embodying our invention without departing from the spirit and scope thereof, and we desire, therefore, that only such limitations shall be placed thereon as are imposed by the prior art and the appended claims.

We claim:

1. In a device of the character described, the combination of a heating pot, a coffee bowl adapted to seat in the top of said pot, said bowl having a depending tube for communication between the pot and bowl, a filter assembly comprising a lower frame, a cloth filter supported on the said frame, an upper frame, means for releasably locking the said frames together to hold the filter cloth therebetween, means for securing the said frames in the bottom of the said bowl, and resilient means tensioning the upper frame against the filter cloth whereby upon the existence of predetermined pressure beneath the said filter cloth the upper frame will be upwardly displaced by the said filter cloth permitting the escape of compressed liquid and gases into the bowl.

2. In a device of the character described, the combination of a heating pot, a coffee bowl adapted to seat in the top of said pot, said bowl having a depending tube for communication between the pot and bowl, a filter assembly comprising a lower frame, a cloth filter supported on the said frame, an upper frame, means for releasably locking the said frames together to hold the filter cloth therebetween, a rod extending through a central portion of the said frames being slidably contained therein and having abutment means thereon for bearing downwardly against the upper frame to hold the filter assembly seated against the bottom of the bowl, the said rod extending through the depending tube and having releasable means controllable at its upper end for securing it to the bottom of the said pot, and resilient means tensioning the upper frame against the filter cloth whereby upon the existence of a predetermined pressure beneath the said filter cloth the upper frame will be upwardly displaced by the said filter cloth to provide a passageway therearound.

3. In a device of the character described, the combination of a heating pot, a coffee bowl adapted to seat in the top of said pot, said bowl having a depending tube for communication between the pot and bowl, a filter assembly comprising a lower frame, an upper frame, an intermediate frame consisting of a plurality of radial members, a cloth filter supported in the said lower frame and held against the said intermediate and upper frames thereby, means for releasably locking the said frames together to hold the filter cloth therebetween and permit its removal therefrom, a rod extending through a central portion of the said frames being slidably contained therein and having abutment means thereon for bearing downwardly against the upper frame to hold the filter assembly seated against the bottom of the bowl, the said rod extending through the depending tube and having releasable means controllable at its upper end for securing it to the bottom of the said pot, and resilient means tensioning the upper frame against the filter cloth whereby upon the existence of a predetermined pressure beneath the said filter cloth the upper frame will be upwardly displaced by the said filter cloth to provide a passageway therearound.

4. In a coffee maker, in combination, a lower vessel, an upper vessel, a filter disc between the vessels, means engaging the filter disc at circumferentially spaced marginal portions to fixedly clamp such portions in the filter operating position, and means yieldingly clamping marginal portions of the filter disc intermediate said fixedly engaged portions to hold said marginal portions in said filter operating position and permitting upward displacement of said intermediate portions in response to abnormal pressure within the lower vessel without disturbing said fixed clamping of the filter disc.

5. A filter assembly adapted as a unit to be inserted into and removed from a coffee maker, having a replaceable filter disc, a lower frame member removable from the unit to permit replacement of the filter disc, an upper frame having plural parts adapted to engage the top of the filter disc to hold it seated in an operative filter position, one of said upper parts being upwardly displaceable from its said holding position in response to excessive pressure against the underside of the filter disc without disturbing the holding position of another of said parts whereby to provide safety relief of pressure from beneath the filter disc.

6. A coffee maker having, in combination, a lower heating vessel, an upper vessel seated on the lower vessel and having a passage providing for the flow of liquid between the vessels, a replaceable filter element adapted to be positioned across said passage within the upper vessel and to marginally seat on said upper vessel, a plural part frame structure for holding the filter element in operative position and for removing said element for cleaning and replacement, plural parts of said frame structure being arranged to engage the upper side of the filter element and clamp it down against its seat, one of said parts being upwardly displaceable by upward displacement of a portion of the filter element in response to abnormal increase in pressure in the lower vessel and another said part serving to hold the upper vessel firmly seated against the lower vessel when the first mentioned part is displaced.

7. A coffee maker having, in combination, a lower heating vessel, an upper vessel seated on the lower vessel and having a passage providing for the flow of liquid between the vessels, and a filter assembly constituting a unit adapted to be inserted into the upper vessel into operative position and removed therefrom, the filter assembly including a replaceable filter element and parts engaging opposite sides of the filter element to hold it in position on said unit, means adapted for coaction with the lower vessel to clamp the filter element against the upper vessel and thereby to clamp the upper vessel against its seat on the lower vessel, said parts constructed and arranged so that the filter element may be upwardly displaced in response to abnormal increase in pressure in the lower vessel while maintaining the upper vessel in its said clamped position.

8. A filter assembly for a coffee maker comprising a central supporting member, an upper and a lower frame member each of a perforate construction to allow passage of liquid through the filter assembly and each having a circular marginal portion, a filter disc adapted to be interposed between said frame members and to be supported between said marginal portions, means supporting said frame members on said central member and providing for detachment of one of said members from the other to permit removal and replacement of the filter disc, and means operative between said central member and the upper frame member adapted for yieldingly urging the marginal portion of the upper frame member against the filter disc to hold it seated in operative position and permitting displacement of said marginal portion away from said operative position against the tension of the yielding means.

9. A filter assembly for a coffee maker comprising a central supporting member, an upper and a lower frame member each of perforate construction to permit the passage of liquid through the filter and each having a marginal portion, a filter disc interposed between said marginal portions, an intermediate frame member positioned between the upper and lower frame members, fixed to the central support and having radial arms adapted to coact with a marginal portion of the filter disc to provide localized clamping thereof in an operative filter position, means detachably connecting the lower frame member with relation to the upper and intermediate frame members to permit removal and replacement of the filter disc, the upper frame member being upwardly movable on the support with relation to the intermediate and lower frame members, and means operative between the support and the upper frame member to yieldingly urge the marginal portion of the upper frame member against the marginal portion of the filter disc and to permit displacement of said marginal portion of the upper frame member against the tension of said yielding means.

10. A filter assembly as set forth in claim 9, in which the marginal portion of the upper frame member is recessed to receive each of the radial arms of the intermediate frame member so that the face of each said arm and the face of the marginal portion of the upper frame member may seat substantially flush against the filter disc.

11. A filter assembly for a coffee maker comprising a rod adapted for holding the filter assembly in operative position in a coffee maker, axially spaced abutments on the rod, a sleeve freely slidable axially and rotatably on the rod between said abutments, a thrust bearing interposed between the upper abutment and the adjacent end of the sleeve, a filter disc, a filter supporting frame including an upper frame member and a lower frame member each of perforate construction to allow for the passage of liquid and each having a circular marginal portion adapted to provide support for the interposed filter disc, means detachably connecting the lower frame member to the sleeve so that said lower frame member may be removed to permit removal and replacement of the filter disc, and means acting against the upper frame member yieldingly urging its marginal portion into engagement with the filter disc to clamp it in operative position and permitting displacement of said marginal portion away from said operative position against the tension of the yielding means.

12. A filter assembly for a coffee maker and the like comprising a rod adapted for connecting the filter assembly in position in the coffee maker, abutments axially spaced on the rod, a sleeve freely slidable axially and rotatably on the rod between the abutments, a filter disc having a center opening adapted for reception of the lower end of the sleeve, an upper frame member axially movable on the sleeve, a lower frame member, means for detachably connecting the lower frame member to the lower end of the sleeve, an intermediate frame member fixed to the sleeve, the lower frame membr and the intermediate frame member being constructed to clamp the interposed filter disc around said center opening to provide an effective seal around the same, the intermediate frame member having parts adapted for clamping peripheral portions of the filter disc in an operative filter position, the upper frame having a part adapted for clamping another portion of the filter disc in said operative position and being upwardly displaceable from said clamping position, and a spring on the sleeve acting against the upper frame member to yieldingly urge it into said operative position and to yieldingly resist said upward displacement of the upper member and thereby permit upward displacement of said other portion of the filter disc in response to abnormal pressure from beneath the filter disc when the assembly is supported in operative position.

13. In a coffee maker, in combination, a lower vessel, an upper vessel removably seated on the lower vessel, said seat adapted to provide a steam-tight seal between the vessels, and means controlling the passage of fluids between the vessels including a replaceable filter supported in a position to filter the flow of fluids between the vessels during the coffee making operation, clamping means operative between the vessels to clamp the upper vessel against its seat on the lower vessel to maintain said steam-tight seal against normal and abnormal pressures within the lower vessel, and means responsive only to abnormal pressure within the lower vessel to provide a substantial passage for the flow of liquid and coffee grounds from the lower vessel into the upper vessel without unseating the upper vessel, the pressure responsive means coacting with the clamping means to maintain the upper vessel seated and said coacting means including a vessel-clamping member which is displaced in response to said abnormal pressure to allow said passage of liquid and coffee grounds.

14. In a coffee maker, in combination, a lower vessel, an upper vessel, a passage between said vessels for the flow of liquid therebetween, a filter cloth, clamping means holding the filter cloth in an operative filtering position in which it establishes a seal across said passage to prevent the movement of coffee grounds from one vessel to the other under normal operation, and means responsive to abnormal pressure within the lower vessel for permitting displacement of at least a portion of the filter cloth from its said seal across said passage to provide by such displacement an unobstructed passage from the lower vessel to the upper vessel for the flow of liquid and coffee grounds therebetween, said clamping means serving also to clamp the upper vessel seated in operative position on the lower vessel to thereby prevent unseating of the upper vessel when the filter cloth is displaced in response to said abnormal pressure.

15. In a coffee maker, in combination, a lower vessel, an upper vessel seated on the lower vessel and having communication therewith for the flow of fluids between the vessels, a filter disc adapted to be held in an operative position to filter said flow of liquids, and a unit of assembly for holding the filter disc in said position and for removing and replacing the filter disc including means coacting between the vessels to clamp the upper vessel seated on the lower vessel under compression sufficient to maintain a steam-tight seal in the event of abnormal pressure within the lower vessel, and means permitting upward displacement of the filter disc to open a substantial relief passage in response to abnormal pressure from within the lower vessel, said relief passage allowing the free flow of liquid and coffee grounds from the lower vessel into the upper vessel, the second mentioned means permitting said upward displacement without unseating the upper vessel from its steam-tight seat on the lower vessel.

16. A coffee maker having, in combination, a lower vessel, an upper vessel, means providing communication for flow of liquid between the vessels in the coffee making operation, a filter element for filtering the flow of said liquid, the upper vessel being removably seated on the lower vessel, the seat between said vessels comprising complemental surfaces adapted to provide a steam-tight seal when engaged one against the other with sufficient pressure, clamping means operating between said vessels to clamp the upper vessel against its seat on the lower vessel with sufficient pressure to maintain said complemental surfaces in said steam-tight seal under both normal and excessive pressures within the lower vessel, and means operative without disturbing said clamping operation and the clamping effect thereof to allow passage of liquid and coffee grounds from the lower vessel into the upper vessel in response to excessive pressure from within the lower vessel, the pressure responsive means coacting with the clamping means to maintain the upper vessel seated and said coacting means including a vessel-clamping member which is displaced in response to said abnormal pressure to allow said passage of liquid and coffee grounds.

17. A coffee maker having, in combination, a lower open top heating vessel, an upper vessel seated on the lower vessel and removable therefrom, a steam-tight seal at the seat between the vessels, means providing communication for flow of liquid between the vessels in the coffee making operation, a filter element for filtering the flow of said liquid, means operating to clamp the upper vessel seated against its seat on the lower vessel to maintain said seal against both normal and excessive pressures in the lower vessel, and means operative without disturbing said clamping operation to allow passage of material from the lower vessel into the upper vessel in response to excessive pressure from within the lower vessel whereby to maintain said steam-tight seal under said condition of excessive pressure, the means for holding the upper vessel seated and for allowing passage of material from the lower vessel to the upper vessel in response to excessive pressure from within the lower vessel comprising a filter assembly having a part detachably connected to the lower vessel adapted to be tightened or loosened by manual operation, a part adapted to clamp the upper vessel against its said seat by tightening of the first mentioned part, and means whereby at least a portion of the filter element is displaceable from its normal operation position to permit the passage of said material.

IVAR JEPSON.
LUDVIK J. KOCI.
ERIC BYLUND.

CERTIFICATE OF CORRECTION.

Patent No. 2,345,262. March 28, 1944.

IVAR JEPSON, ET AL.

It is hereby certified that error appears in the printed specification of the above numbered patent requiring correction as follows: Page 1, second column, line 35, for "Patent No. 2,312,444" read --Patent No. 2,312,555--; page 2, first column, line 35, before "part" insert --frame--; page 5, first column, line 53, for "sleve" read --sleeve--; line 55, for "membr" read --member--; and that the said Letters Patent should be read with this correction therein that the same may conform to the record of the case in the Patent Office.

Signed and sealed this 30th day of May, A. D. 1944.

Leslie Frazer (Seal) Acting Commissioner of Patents.